United States Patent [19]

Rao et al.

[11] Patent Number: 5,262,045
[45] Date of Patent: Nov. 16, 1993

[54] CATALYTIC REFORMING PROCESS UTILIZING AN IRON-AND-LANTHANUM-CONTAINING METALLOSILICATE ZEOLITE

[75] Inventors: Katikaneni S. P. Rao; Subramanian Sivasanker; Paul Ratnasamy; Kondam M. Reddy, all of Maharashtra, India

[73] Assignee: Council of Scientific & Industrial Research, New Delhi, India

[21] Appl. No.: 788,222

[22] Filed: Nov. 5, 1991

Related U.S. Application Data

[62] Division of Ser. No. 580,800, Sep. 11, 1990, Pat. No. 5,141,908.

[51] Int. Cl.$^5$ .................................... C10G 35/085
[52] U.S. Cl. ............................ 208/139; 208/135; 208/137; 208/138
[58] Field of Search ............... 208/135, 137, 138, 139; 502/66

[56] References Cited

U.S. PATENT DOCUMENTS

| | | | |
|---|---|---|---|
| 4,337,176 | 6/1982 | Boersma et al. | 423/326 |
| 4,371,628 | 2/1983 | Nanne et al. | 585/469 |
| 4,443,552 | 4/1984 | Iida et al. | 502/66 |
| 4,443,640 | 4/1984 | van der Meijden et al. | 208/137 |
| 4,512,877 | 4/1985 | Kieffer et al. | 208/135 |
| 4,595,669 | 6/1986 | Fung et al. | 502/66 |
| 4,698,449 | 10/1987 | Imai et al. | 423/326 |
| 4,950,385 | 8/1990 | Sivasanker et al. | 208/137 |
| 4,952,385 | 8/1990 | Nair et al. | 423/326 |
| 5,013,537 | 5/1991 | Patarin et al. | 208/134 |

*Primary Examiner*—Theodore Morris
*Assistant Examiner*—Walter D. Griffin
*Attorney, Agent, or Firm*—Ladas & Parry

[57] ABSTRACT

Novel catalyst composite material is disclosed which comprises in combination a crystalline metallosilicate zeolite in terms of mole ratios having the general formula:

$$O\text{-below } 0.4X:M_2O_3:30\text{-}300SiO_2:10H_2O$$

wherein M is iron, lanthanum or mixtures thereof and X is selected from the oxides of sodium, hydrogen, platinum, iridium, rhenium and mixtures thereof, alumina and a chlorine component. This catalyst has a long and stable activity and no loss of components is encountered during the reforming of pyrolysis naptha and more importantly it is observed that the pyrolysis naptha does not have to be hydrogenated prior to contacting it with the catalyst. Reforming of pyrolysis naptha to a liquid fraction containing more than 99% of aromatic hydrocarbons is achieved.

5 Claims, No Drawings

CATALYTIC REFORMING PROCESS UTILIZING AN IRON-AND-LANTHANUM-CONTAINING METALLOSILICATE ZEOLITE

This is a divisional of copending application Ser. No. 07/580,800 filed on Sep. 11, 1990, U.S. Pat. No. 5,141,908.

The present invention relates to a novel catalyst composite material. More specifically, it relates to a process for the preparation of a catalyst composite material useful for hydrocarbon reactions more particularly for the reforming of pyrolysis naptha to a liquid fraction containing more than 99% of aromatic hydrocarbons.

Pyrolysis naptha is obtained by steam cracking of naptha in naptha crackers in the manufacture of olefins like ethylene, propylene and butene valuable primary raw material for the petrochemical industry. While the major products of the naptha cracker are the above mentioned light olefins, a significant by product of the process (25-30%) is constituted of a highly olefinic liquid called pyrolysis naptha sometimes also designated as pyrolysis gasoline since the octane number of the liquid is high warranting its use as a gasoline component. Pyrolysis naptha contains a significant quantity of aromatics like benzene, toluene and xylenes in addition to the olefins and diolefins. These latter components are very susceptible to polymerisation and will form high boiling polymers which degrade to coke. For this reason, in prior art, pyrolysis naptha is subjected to a prior hydrogenation before processing for recovery of the valuable aromatic hydrocarbons.

In prior art, the aromatics are separated from the hydrogenated pyrolysis naptha by solvent extraction with selective solvents like sulpholane, ethylene glycol etc. U.S. Pat. Nos. 3,239,453 and 3,239,454 for example describe such prior art processes. Catalytic processes for the conversion of pyrolysis naptha are also known in prior art. U.S. Pat. No. 4,097,367 describes the catalytic conversion of olefinic naptha to a product stream which contains little or no non-aromatics boiling in the range of benzene, toluene and xylenes. The catalysts are combinations of zinc and a group VIII metal typically palladium, along with a crystalline aluminosilicate zeolite, typically ZSM-5.

One major limitation of all the catalysts used in the prior art for catalytic conversion of pyrolysis naptha including that described in U.S. Pat. No. 4,097,367 which utilise an aluminosilicate zeolite containing zinc is that the catalyst undergoes a fast deactivation in performance due to the loss of zinc from the catalyst composite material. FIG. 2 of U.S. Pat. No. 4,097,367 specifically illustrates the loss of zinc from Zn/ZSM-5 and Zn-Pd/ZSM-5 catalysts during the conversion of pyrolysis naptha within one day.

The pyrolysis naptha used as a feedstock in the present process may be obtained from a variety of sources like naptha cracker, a delayed coker of heavy petroleum fractions (coker naptha) or a visbreaker. It usually contains olefins, diolefins, conjugated olefins and monocyclic aromatics.

Compared to the catalyst composite material of prior art, the catalyst composite material according to the invention has the following distinguishing features:
1. It has a long and stable activity and no loss of the components is encountered during reforming of pyrolysis naptha.
2. It does not use crystalline aluminosilicate zeolites as catalyst components.
3. Elements such as zinc are not present as constituents of the catalyst composite material.
4. In the crystalline metallosilicates zeolite the metal is iron or lanthanum or mixtures thereof which are constituents of the catalyst composite material.
5. The pyrolysis naptha does not have to be hydrogenated prior to contacting it with the catalyst composite material.

According to the invention, the crystalline matallosilicate zeolite is blended with alumina, extruded, dried and calcined and the noble metal platinum incorporated therein a set out hereinbelow. The final catalyst composite material of this invention contains, on a dry basis, 0.1 to 50% of the metallosilicate zeolite, 0.1 to 1.0% of platinum, optionally 0-2% of one or metals chosen from the group, iridium, rhenium, the balance of the composition being alumina. Preferably, the catalyst composite material contains 0.1 to 10% wt of the metallosilicate zeolite, 0.1 to 0.4% of platinum and the balance being alumina.

The catalyst may also contain 0.1-2.0% of chlorine added in the form of HCl or $AlCl_3$ during its preparation. Platinum metal and optionally rhenium or iridium are incorporated into the catalyst by impregnation procedures or ion-exchange procedures.

In one embodiment of the present invention, reforming of pyrolysis naptha is carried out at a temperature above 400° C. and preferably at 450°-520° C. a pressure of atmospheric to 25 bar, preferably between 3-15 bar and a WHSV of 0.5 to 5.0, preferably 1.0-3.0. The pyrolysis naptha in admixture with hydrogen is preheated to the reaction temperature and contacted with the catalyst composite material contained in a reactor in the reaction zone. The effluent from the reaction zone contains, in addition to the hydrogen, light hydrocarbons containing 1 to 6 carbon atoms, aromatic hydrocarbons like benzene, toluene and xylenes and minor quantities of aliphatic hydrocarbons containing 7 or more carbon atoms. The hydrocarbon effluent is first separated into a fraction boiling below 70° C. and a heavier fraction consisting of more than 99% wt of aromatics. The individual aromatics, benzene, toluene and xylenes are then separated from the heavier fraction by fractional distillation. The hydrogen from the reaction zone, after separation of the light hydrocarbons contained in it, is compressed and recycled to the reaction zone.

The present invention relates to a novel catalyst composite material which gives yields of aromatics fractions greater than that present in the feed pyrolysis naptha. These novel catalyst composites contain a crystalline metallosilicate of general composition in terms of mole ratios as follows:

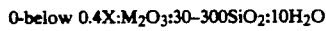

$$0\text{-below } 0.4X:M_2O_3:30\text{-}300SiO_2:10H_2O$$

where, M can be iron, lanthanum, or mixtures thereof, X is selected from the oxides of sodium, hydrogen, platinum, iridium, rhenium and mixtures thereof.

One feature of the present invention is that the ion M occurs in the crystal lattice along with silicon and that X is constituted of the oxides of sodium, hydrogen, platinum iridium or mixtures thereof.

Zeolites in general and the novel metallosilicate zeolites in particular described hereinunder have well-defined narrow range of acidity. The present invention relates to a novel catalyst composite material consisting of the metallosilicate zeolite with a narrow range of acid strengths suitable for reforming reactions. The novel catalyst composite material consists of a metallosilicate zeolite and aluminium oxide along with Pt. These novel composite materials when used as pyrolysis naptha reforming catalysts do not suffer from the above mentioned drawbacks and limitations of the prior-art conventional reforming catalysts and besides, yield greater quantities of aromatics due to maximization of acid centres of the optimum strength required for the cracking and oligomerisation reactions, wherein the olefinic products of cracking reactions are converted to aromatics by oligomerisation.

According to the invention, the iron containing crystalline metallosilicate, has a silica to iron oxide molar ratio of at least 30 but not more than 200, and a sodium oxide to iron oxide molar ratio of at least 0.7 but not more than 1.3. Preferably, the iron ions in the metallosilicate are in the trivalent positive oxidation state. Further, the trivalent iron ions, $Fe^{3+}$, are in crystalline framework lattice positions and are not present as non-framework cations in positions where they can be replaced by other cations by conventional methods of ion-exchange.

The structural features of the metallosilicate can be conveniently characterised by variety of techniques. The x-ray powder diffraction measurements shown in Table 1 were obtained on a Phillips PW 1730 diffractometer using copper K radiation in conjunction with a nickel filter. In reporting the results obtained in Table 1, the interplanar spacings are represented by 'd' and are expressed in terms of Aungustram units (A); the relative intensity values are represented by $I/I_g$ and are expressed in terms of the relative peak heights. The framework vibration frequencies (in $cm^{-1}$) of metallosilicate containing iron cations in lattice positions are shown in Table 2. The infrared spectra were recorded with a Perkin-Elmer infrared spectrometer. In this connection, it is to be understood that the x-ray diffraction and infrared framework vibration frequencies are characteristics of all the species of metallosilicate composition. Ion exchange of the ions with other cations like $H^+$, $NH_4^+$, $K^+$, $Ca^{2+}$ reveal substantially the same pattern with some minor shifts in the interplaner spacings or vibration frequencies and variation in the relative intensity of the various peaks. Other minor vibrations can occur depending on the silicon to iron ratio of the particular sample as well as if it had been subjected to steam treatment at elevated temperatures for prolonged periods of time.

TABLE 1

| X-ray diffraction pattern | |
|---|---|
| d | $I/I_g$ |
| 11.0420 | 83.30 |
| 9.9945 | 62.57 |
| 9.7096 | 15.90 |
| 7.4057 | 10.22 |
| 7.0752 | 6.93 |
| 6.6713 | 7.95 |
| 6.3203 | 11.36 |
| 5.9804 | 10.22 |
| 5.6755 | 9.29 |
| 5.5345 | 9.09 |
| 5.3679 | 3.40 |
| 5.1038 | 3.40 |
| 4.9087 | 5.68 |
| 4.5950 | 6.25 |
| 4.4357 | 3.40 |
| 4.3496 | 9.09 |

TABLE 1-continued

| X-ray diffraction pattern | |
|---|---|
| d | $I/I_g$ |
| 4.2467 | 15.99 |
| 4.0733 | 5.68 |
| 4.0080 | 9.09 |
| 3.8371 | 100.00 |
| 3.7416 | 34.00 |
| 3.7047 | 46.59 |
| 3.6449 | 32.81 |
| 3.4293 | 11.36 |
| 3.3285 | 5.50 |
| 3.2406 | 4.54 |
| 3.1291 | 2.84 |
| 3.0394 | 10.79 |
| 2.9378 | 5.60 |

TABLE 2

| Infrared framework vibration frequencies | |
|---|---|
| Frequency ($cm^{-1}$) | Intensity |
| 455 | MS |
| 550 | MS |
| 590 | M |
| 620 | M |
| 678 | M |
| 730 | M |
| 800 | MS |
| 870 | MS |
| 888 | MS |
| 1040 | S |
| 1100 | S |
| 1230 | MS |

| Note Absorption (%) | Assigned intensity |
|---|---|
| Less than 10 | VW (very weak) |
| 10–19 | W (weak) |
| 20–39 | M (medium) |
| 40–69 | MS (medium strong) |
| 70–89 | S (strong) |

According to the invention, the trivalent iron ions present in the noval metal silicate catalyst composite material cannot be replaced by other cations by conventional techniques of ion-exchange. This unique stability of the iron ions to ion-exchange is due to their incorporation in the zeolite lattice itself and their absence in the intracrystalline void volume as non-framework cations in which position they could have been replaced by other cations.

More importantly the trivalent iron ions present in the catalyst composite material of this invention cannot be reduced to the divalent or lower oxidation states by conventional methods of reduction in hydrogen. This unique stability of the iron ions to reduction is due to their incorporation in the lattice itself and their absence in the intracrystalline void volume as an oxide of iron (like $Fe_2O_3$, $Fe_3O_4$) in which position they could have been reduced to the metallic state.

Furthermore, the trivalent iron ions incorporated in the tetrahedral lattice framework may be characterised by electron spin resonance spectroscopy by having a strong absorption band at 9=4.3 characteristic of $Fe^{3+}$ surrounded by oxygen anions at the corners of a tetrahedron. This observation confirms that the trivalent iron ions are indeed present in the tetrahedral zeolitic lattice and not in non-framework positions, wherein they will be surrounded by six oxygen anions at the corners of an octahedron and hence would not exhibit the absorption band at g=4.3 in the electron spin resonance spectrum.

The metal silicate of this invention has an exceptionally high degree of thermal stability up to 1000° C., thereby rendering it especially suitable for use in processes involving elevated temperatures. In this connection, the ferrisilicate catalyst composite material appears to be one of the most stable zeolites known to date.

By regulation of the quantity of iron in the synthesis mixture, it is possible to vary the silicon to iron molar ratio in the final product in a range of from about 30 to about 300.

Examples of sources of silicon useful in this invention are sodium silicate, silica gel silicon dioxide formed silica and silicic acid. Typical sources of iron include the sulphates, nitrates, hydroxides and oxides of iron. The hydroxides, nitrates and sulphates of alkali metals are examples of the metal cations.

The crystalline ferrisilicate of the present invention may be prepared by a variety of methods including the formation of a firm gel by reaction of a source of iron with source of silicon at temperatures in the range of 100° to 200° C. in an autoclave reactor under autogeneous pressure of steam in the above temperature range. The source of iron can be iron nitrate, iron sulfate, iron oxides and hydroxides in various structural and textural modifications. The source of silica may be oxides of silicon in various physical modifications like colloidal silicon, fumed silica, chromatographic silica, silica gel and sodium silicate.

In a further embodiment of the present invention, the reaction mixture of hereinbefore described is maintained at temperatures in the range of 100°-300° C. for periods ranging from 1 to 15 days.

In a further embodiment of the present invention the sodium ions in the ferrisilicate zeolite are replaced by protons by ion-exchange with $NH_4^+$ ions followed by calcination in air.

In yet a further embodiment of this invention, the pore structure of the material is characterised by the amount of $H_2O$ n-hexane, cyclohexane and 2-methylpentane that may be absorbed in the porous cavities of the said material at 24° C. While the extent of hydrophilicity of the porous cavities is indicated by the amount of $H_2O$ adsorbed, the adsorption of n-hexane may be used to evaluate the hydrophobic nature of the internal surface of the zeolite material as well as the actual integral void volume of the said material. A comparison of the amount of adsorption of n-hexane, neopentane, benzene and cyclohexane gives an indication of the diameter of the pores in the crystalline ferrisilicate since the three hereinbefore mentioned molecules differ mainly in their cross-sectional dimensions and otherwise possess similar hydrophobic character. In the examples hereinafter mentioned, whenever adsorption data are given, they were measured gravimetrically in a high vacuum adsorption system using a quartz spring balance. The zeolite sample was degassed at 400° C. for 4 hours at a pressure lower than $10^{-3}$ bar. The sample was then cooled to 24°. The sorbate was then admitted and the amount adsorbed at equilibrium was noted. It is invariably found that for the crystalline ferrisilicate zeolites prepared according to the present invention, the amount of n-hexane adsorbed per unit weight of solid is always higher than the amount of water adsorbed indicating a highly hydrophobic nature of the internal surface contained in the pores of the zeolites. The hydrophilicity, as measured by the amount of $H_2O$ adsorption and the surface acidity, as measured by the amount and strength of $NH_3$ adsorption on the ferrisilicate is intermediate between the high values observed in the case of aluminosilicate zeolites and the very low values observed in the case of polymorphous of $SiO_2$. The metal silicate of this invention, is a molecular sieve with an adsorption pore size near 6 A°. At 24° C., it adsorbs molecules as large as benzene (kinetic diameter=5.9 A°) but rejects molecules larger than 6 A° such as neopentane (kinetic diameter=6.2 A°).

For many applications, solid materials, which have catalytic properties, are usually dispersed with another material, called the binder, to impart greater mechanical strength to the solid composite. Examples of such material which can serve as binders, include silica, alumina, bentonite, kaolinite and mixtures thereof. The process for preparing the catalyst composite material of the present invention also provides that the metal silicate is combined with a binder like alumina, bentonite, kaolinite in an amount between 0.1 to 70 weight %.

An advantage of the present invention is that over the novel catalyst composite material the cracked gaseous products and any added olefinic material are converted into aromatics through oligomerization and alkylation reactions.

Another advantage of the invention is that the catalysts can operate at very high severity conditions, with low deactivation rates. Their operation at high severity conditions leads to larger aromatics yields due to thermodynamic advantages.

An additional advantage of the present invention is that the catalyst can use cracker and pyrolysis gasolines which contain larger amounts of olefins as feed materials for aromatics production which is not economically possible on conventional prior-art catalysts due to their rapid deactivation when using olefinic feedstocks.

A further advantage of the present invention is that the catalysts can be used to yield reformates which consists almost completely of aromatic compounds, this being an important advantage as this leads to the avoidance of aromatics extraction, an expensive step in the manufacture of aromatic hydrocarbons.

Yet a further advantage of the present invention is that the liquid product has little or no $C_{7+}$ hydrocarbons which is again desirable in the subsequent processing steps.

Yet another and important advantage of the novel catalyst composites is that because the acid centers for the reforming reactions are contributed by the novel metalsilicate material and the strength of these acid sites are permanent, chlorine addition during the reaction and also strict moisture control of the recycle gas are not so critical.

A feature of the present invention is that the novel metalsilicate zeolite material A (hereinunder described) is blended with material B, alumina hydrate (hereinunder described) extruded, dried and calcined and the noble metal platinum and the promoters incorporated therein as set out hereinbelow. The catalyst contains 0.1–50% of the zeolite material A, 0.1–1% of platinum and 0–2% of one or more of the promoters chosen from the group rhenium, iridium, the balance of the composition being material B, alumina. In a preferred embodiment of the present invention the catalyst composite material contains 0.1–10% of the zeolite material A, 0.1–0.4% wt. of platinum the rest being alumina.

Accordingly, the present invention provides a catalyst composite material for hydrocarbon reactions comprising in combination a crystalline metallosilicate zeolite in terms of mole ratios having the general formula:

O-below 0.4X:M$_2$O$_3$:30–300SiO$_2$:10H$_2$O wherein M is iron, lanthanum or mixtures thereof and X is selected from the oxides of sodium, hydrogen, platinum, iridium, rhenium and mixtures thereof, alumina and a chlorine component.

The present invention also provides a process for the preparation of a catalyst composite material useful for hydrocarbon reactions which comprises incorporating a crystalline metallosilicate of general composition in terms of mole ratio of formula O-below 0.4X:M$_2$O$_3$:30–300SiO$_2$:10H$_2$O wherein M is iron, lanthanum or mixtures thereof and X is selected from the oxides of sodium, hydrogen, platinum, iridium, rhenium or mixtures thereof with alumina and adding chlorine to the resultant mixture in the form of HCl or AlCl$_3$ and adding a salt of one or two of the metals from the group platinum, rhenium or iridium and shaping it into the final form.

The present invention further provides a process for reforming of pyrolysis naptha comprising contacting the naptha and hydrogen at reforming conditions with the catalyst composite material described as above.

The invention is illustrated with the following examples which should not be construed to limit the scope of the invention:

EXAMPLE 1

Preparation of metallosilicate metarial

This example illustrates the preparation of the metallosilicate zeolite where M is iron. To 20 g of sodium silicate (8.2% Na$_2$O, 27.2% SiO$_2$), 10 ml of water is added to constitute solution A. 2.5 g of tetrapropyl ammonium bromide is dissolved in 10 ml of water to yield solution B. 0.54 of ferric sulphate (31.2% Fe$_2$O$_3$) is added to water and heated to 50° C. to yield a clear solution C. 1.75 g of H$_2$SO$_4$ (98%) is diluted in 15 ml of water to produce solution D. Solution B is added to solution A with stirring. Solution C is then added to the mixture with stirring. Solution D is finally added to the resulting mixture dropwise with constant vigorous stirring. A solid gel is formed whose pH is about 10.2. The gel with the slurry is heated at 180° C. in a closed autoclave under autogenous pressure of steam for one day. After this process, the autoclave is quenched in cold water. The autoclave is opened and the supernatent liquid is separated from the solid product by filtration. The pH of the supernatent liquid is 11.2. The solid product is washed with water till the washings are free from sulphate ions. The solid is then dried in an air oven at 120° C. for 12 hours and calcined in air at 520° C. for 8 hours to yield a solid crystalline material. The chemical composition of the material in the anhydrous form is 0.8 Na$_2$O:Fe$_2$O$_3$:71SiO$_2$.

EXAMPLE 2

This example illustrates the process for replacing sodium ions in the crystalline ferrisilicate prepared as per example 1 with ammonium ions. The above solid is treated twice with an aqueous solution of 5N ammonium chloride at 90° C. for 15 hours each time. After each exchange, the product is washed with distilled hot water, till the filtrate is free from chloride ions. The product thus obtained is dried at 120° C. in an air oven to yield the ammonium form of the zeolite. The molar ratio of the sodium oxide to iron oxide in the material is 0.04. By varying the concentration of NH$_4$Cl and the number of exchanges the sodium oxide content can be varied as desired.

EXAMPLE 3

This example illustrates the process for replacing the ammonium ions in the crystalline ferrisilicate zeolite by hydrogen ions. The product of example 2 is dried at 110° C. and calcined at 520° for 10 hours in a stream of dry air to yield the hydrogen form of the zeolite.

EXAMPLE 4

The example illustrates the general process for replacing the ammonium ions in the crystalline ferrisilicate by ions from the group platinum, rhenium or iridium. Specifically the replacement of ammonium ions by platinum ions is illustrated. Ten grams of the material prepared as per example 2 is heated with an aqueous solution (200 ml) containing 0.12 g of tetramino platinum (II) dichloride at 90° for 12 hours. The resulting product is filtered and dried at 110° for 12 hours and calcined at 500° C. for 6 hours. The platinum content of the final product is 0.4%.

EXAMPLE 5

Preparation of alumina

Method 1

This method illustrates the preparation of an alumina using aluminium nitrate as the raw material. 300 g of aluminium nitrate 6 H$_2$O was dissolved in 800 ml of demineralised water and the solution kept at 70° C. A dilute solution (3 liters) of ammonium hydroxide containing 260 ml of 25% ammonium hydroxide (liquor ammonia) also kept at 70° C. is added rapidly in one lot to the above aluminium nitrate solution with vigorous stirring of the mixture. The pH of the final mixture is 8.5. The gel is allowed to cool for one hour and then filtered using a Buchner funnel. The cake is washed 3 times by reslurrying each time with 500 ml of demineralized water. The washed gel is dried in an air oven at 110° C. for 12 hours. The hydrate is crushed and sieved to pass 200 mesh (ASTM) before incorporation in the final catalyst composite material.

Method 2

This method illustrates the preparation of an alumina sample (suitable for the preparation of the novel catalyst composite material) using sodium aluminate as the raw material. One liter of a solution of sodium aluminate is prepared using demineralised water such that the aluminium oxide (Al$_2$O$_3$) content on dry basis is 51 g. This solution is kept at 40° C. and a 6 normal (6N) solution of nitric acid prepared in demineralised water is added to the sodium aluminate solution slowly with stirring till the pH of the solution is 7. The time taken for the addition is about 15 minutes. The gel is aged for 24 hours at 40° C. and filtered on a Buchner funnel. The filtered cake is reslurried and filtered 3 times using 500 ml of demineralised water each time for slurrying. The cake is then washed again 2 times as before but using 1% ammonium hydroxide (500 ml) for slurrying. The final cake is dried at 110° C. for 12 hours, powdered and sieved to pass 200 mesh (ASTM).

Method 3

Commercially available pseudoboehmite (for example, the material Catapal-B supplied by VISTA Chemical Europe, Brussels, Belgium) could also be used for the preparation of the composite catalyst materials. The alumina is powdered and sieved to pass 200 mesh (ASTM).

EXAMPLE 6

This example illustrates the preparation of a catalyst composite material using a ferrisilicate zeolite as described in Examples 1, 2 and 3 and alumina hydrate prepared by the sodium aluminate route as described in Example 5, Method 2. 100 g of the powdered alumina hydrate (73 g of dry alumina) is blended with 4.0 g of the ferrisilicate thoroughly. A 10 wt. % solution of acetic acid in water is added to the mixture of the dry powders such that the added acetic acid constituted 2 percent by weight of the dry solids. Enough demineralised water is then added and the constituents kneaded to give a dough suitable for extrusion. The kneaded dough is then extruded to give approximately 1/16" dia final catalyst. The extrudates of the mixture of the zeolite and the alumina hydrate are dried first at room temperature (6 hours) then at 110° C. (12 hours) and calcined at 550° for 6 hours. The final extrudates contain 5 wt. % of the ferrisilicate zeolite.

The calcined extrudates (35 g) are added to a dilute solution of hydrochloric acid (15 ml of 1.1N HCl diluted to 500 ml) under mild agitation at room temperature for 6 hours. The extrudates are filtered off and dried at 110° C. for 2 hours.

The dried chlorine loaded extrudates (35 g) are next added to a dilute solution (2 liters) of hexachloro platinic acid containing enough platinum to give a final catalyst with a platinum content of 0.6%. The soaking is carried out for 24 hours at room temperature with mild agitation. The extrudates are then filtered and dried at 110° C. for 12 hours and then calcined at 550° C. for 6 hours. This catalyst is called A.

EXAMPLE 7

This example illustrates the preparation of a catalyst composite material using the ferrisilicate zeolite containing ion-exchanged platinum and prepared as set out in examples 1, 2 and 4 and alumina hydrate pepared from aluminium nitrate as described in Example 5, Method 1.

The preparation of this catalyst sample is identical to that described in Example 6 except for the fact that the platinum content of the impregnating solution is reduced to compensate for the platinum already present on the zeolite in anion exchanged form. The final platinum level in the whole catalyst is 0.6%. This catalyst is designated as B.

EXAMPLE 8

This example describes the preparation of a catalyst composite material containing 10% of the ferrisilicate material.

The preparation of this sample is similar to that described in Example 6 excepting that the material B is obtainined from a commercial source, as set out in Example 5, Method 3. Also, a larger amount of the ferrisilicate (prepared as set out in Examples 1, 2 and 4) is used for the formulation so that the final formulation has 10% (on dry basis) of the zeolite. Again, the platinum content of this preparation is adjusted to be 0.6%. This catalyst composite is designated as C.

We claim:

1. A process for catalytic reforming of pyrolysis naphtha comprising contacting naphtha and hydrogen under reforming conditions in the presence of alumina, platinum and an iron and lanthanum-containing metal-losilicate zeolite wherein the molar ratio of iron (III) and lanthanum (III) oxide or a mixture thereof to silicon dioxide is from 1:30 to 1:300.

2. A process according to claim 1 wherein the alumina is chlorinated.

3. A process according to claim 1 wherein the catalyst further comprises an oxide of an element selected from the group consisting of sodium, rhenium, iridium and mixtures thereof.

4. The process according to claim 1 wherein the reforming conditions include a temperature range of 400°-520° C. and atmospheric pressure to 25 bar.

5. The process as claimed in claim 1 wherein the temperature is from 450° C.-520° C. and the pressure is from 3-15 bar.

* * * * *